UNITED STATES PATENT OFFICE.

EGBERT GULICK, OF STARKEY, NEW YORK, ASSIGNOR TO LIVONIA A. GULICK, OF SAME PLACE.

MINERAL FERTILIZER.

SPECIFICATION forming part of Letters Patent No. 522,561, dated July 3, 1894.

Application filed May 23, 1892. Serial No. 434,022. (No specimens.)

*To all whom it may concern:*

Be it known that I, EGBERT GULICK, of Starkey, in the county of Yates, in the State of New York, have invented new and useful Improvements in Mineral Fertilizers, of which the following is a full, clear, and exact description.

My invention relates to mineral fertilizers. My object is to produce a fertilizer composition of cheap ingredients and very effective in its results.

My composition consists of the following ingredients, combined and commingled in substantially the proportions stated, and which are necessarily varied more or less according to the different purposes to which the fertilizer is applied, viz: aluminous shale, eighty per cent.; charcoal of carbon, twenty per cent., the shale being used in the condition in which it is removed from the earth, and the charcoal being used in the ordinary form. These ingredients are either ground separately, to any degree of fineness desired, and then mixed together and thoroughly commingled, or can be mixed and then ground or pulverized together, using any kind of mill, crusher, or pulverizer suitable for the purpose. When thus prepared it is applied to the soil in any manner desired, either as a top dressing, or working in to any depth desired, and from its constituency contains all of the natural elements to promote chemical action in condensing in its pores from the atmospheres carbonic acid gas, ammonia, and water, and to absorb them in sufficient quantities to promote and retain moisture in the soil in dry weather, which is taken up by plants and vegetation as nature requires. These substances have the power without any further preparation of absorbing, even when cold, aeriform fluids and condensing them in their pores in quantities many times exceeding their bulk, and thus when mixed into the soil, the fertilizer operates both to absorb said fluids, and to retain them for use and absorption by the plants according to the process of nature, thus retaining and supplying said fluids even through a protracted spell of dry weather.

It is to be understood that an essential feature of my invention consists in the employment of a particular kind of carbon, namely wood charcoal, as distinguished from various forms of impure carbon and carbonaceous compounds. I have found that charcoal (preferably that made from dense wood in closed retorts) possesses properties of special utility for the purpose of the invention, as for example the property of absorbing and condensing gases and vapors to a remarkable extent. It is readily mixed by grinding with aluminous shale. The mixture of aluminous shale and charcoal is permanent and practically indestructible, the two ingredients producing no action one upon another, and the absorbent properties thereof being unimpaired by time or the action of the elements. The mixture as a fertilizer, does not act directly upon the plants, but only as a medium for the supply of moisture and gases occluded from the atmosphere and soil. It therefore requires no renewal, but only to be stirred from time to time.

I claim as my invention—

The herein described composition of matter for use as a fertilizer, consisting of a mixture of aluminous shale and wood charcoal in approximately the proportions specified.

In witness whereof I have hereunto set my hand this 20th day of April, 1892.

EGBERT GULICK.

In presence of—
C. W. SMITH,
H. P. DENISON.